3,657,198
PROCESS FOR THE PREPARATION OF
AROMATIC POLY-N-ALKYL URETHANES
Kurt Weirauch, Krefeld, Heinrich Krimm, Krefeld-Bockum, Gunther Lenz, Krefeld, and Hermann Schnell, Krefeld-Uerdingen, Germany, assignors to Farbenfabriken Bayer Aktiengesellschaft, Leverkusen, Germany
No Drawing. Filed Sept. 25, 1970, Ser. No. 75,696
Claims priority, application Germany, Sept. 27, 1969,
P 19 49 011.0
Int. Cl. C08g 22/04
U.S. Cl. 260—77.5 B                                    6 Claims

ABSTRACT OF THE DISCLOSURE

Reaction of substantially equimolar proportions of N,N'-dimethyl-N,N'-dialkyldiaminophenyl compounds with bis-chlorocarbonic acid esters of aromatic dihydroxy compounds at temperatures between about 50 and about 350° C. to produce the title products which are useful as thermoplastic molding materials for producing films and foils.

Aromatic poly-N-alkyl urethanes are already known (Dutch specifications Nos. 6811999 and 6810887, as open to inspection). Because of their high thermal stability at elevated temperature, mechanical strength and marked resistance to solvolysis, they are valuable materials. Various processes are known for their preparation. Common to all these processes is that secondary aromatic amino groups are reacted with aromatic derivatives of carbonic acid. Thus, for example in the phase boundary method or the solution polycondensation method, N,N'-dialkyl diaminophenyl compounds are reacted with bis-chlorocarbonic acid esters of aromatic bis-phenols, hydrogen chloride being eliminated.

According to the present invention, aromatic poly-N-alkyl urethanes are obtained by a process which comprises reacting N,N'-dimethyl-N,N'-dialkyl-diaminophenyl compounds with bis-chlorocarbonic acid esters of aromatic dihydroxy compounds at temperatures of between about 50° C. and about 350° C., preferably between about 120° C. and about 220° C., methyl chloride being eliminated. The process is advantageously carried out in an inert atmosphere.

To carry out the process of the invention the reactants are e.g. mixed in equimolar or approximately equimolar quantities, this means preferably in a molar ratio from 0.8:1 to 1.2:1, most preferably 1:1, e.g. under nitrogen, at room temperature in a distillation apparatus equipped with a stirrer and heated. Above about 100° C., methyl chloride is rapidly eliminated and the reaction mixture, which is at first a thin liquid, becomes increasingly more viscous. It is advantageous to raise the temperature gradually and thus keep the reaction mixture in a plastic state.

In order to ensure efficient transfer of heat at all times, it is advisable to add inert organic solvents such as xylene, monochlorobenzene, dichlorobenzene, diphenyl ether, diphenyl, chlorinated diphenylene and similar high boiling liquids, because the polyurethanes generally only start to soften at about 200° C., but at this temperature, the rate of condensation is so high that the rapidly forming high molecular weight products cannot escape sufficiently rapidly and, therefore, became wrapped round the stirrer. If solvents are used, however, the reaction mixture remains homogeneous during the entire reaction and the solvent can then be removed from the mixture at the end of condensation by vacuum distillation. Another method of isolating the polymers consists in precipitating the polymer by the addition of a non-solvent such as e.g. ligroin, white spirit and similar unpolar solvents.

The polymers are soluble in the usual organic solvents such as chlorinated paraffins and aromatic compounds and can be cast from such solutions to form films and foils. They are thermoplastic and can be worked up by the usual methods of thermoplastic moulding.

The N,N' - dimethyl - N,N'-dialkyl-diaminophenyl compounds suitable as starting material for the process of the invention may be represented by the following formula:

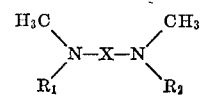

in which $R_1$ and $R_2$ represent aliphatic radicals containing 1 to 4 carbon atoms such as methyl, ethyl, propyl or butyl and X represents a bifunctional aromatic radicals, e.g. phenylene, diphenylene, diphenylene alkane, diphenylene cycloalkane, diphenylene ether, diphenylene sulphone, diphenylene sulphoxide and diphenylene sulphide, or a multi-nuclear radical such as 1,3- or 1,4-bis-(phenyl-isopropyl)-benzene.

The tetramethyl-diamino compounds which are easily accessible are preferably used. The following are mentioned as examples:

bis-(4-N,N-dimethylaminophenyl),
bis-(4-N,N-dimethylaminophenyl)-methane,
2,2-bis-(4-N,N-dimethylaminophenyl)-propane,
bis-(4-N,N-dimethylaminophenyl)-phenylmethane and
bis-α,α'-(4-N,N-dimethylaminophenyl)-p-diisopropyl-benzene.

Diaminodiphenyl compounds which are asymmetrically substituted on the N atoms, such as bis-(4-N,N-methylethylaminophenyl),
bis-(4-N,N-methyl-n-propylaminophenyl)-methane and
2,2-bis-(4-N,N-methyl-i-propylaminophenyl)-propane
are also suitable.

The bis-chlorocarbonic acid esters of aromatic dihydroxy compounds which are suitable as starting material in the process of the inventions have the following formula:

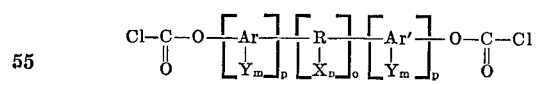

in which

Ar and Ar', which may be the same or different, represent mono- and bi-cyclic aromatic radicals such as phenylene and diphenylene, R represents an alkylidene group such as methylene and isopropylidene or a cycloalkylidene group such as cyclopentylidene, cyclohexylidene or —O—, —SO$_2$—, —SO—, —S—,

or —CO—,

X represents a monofunctional $C_1$-$C_6$ hydrocarbon radical such as methyl, ethyl, butyl, hexyl and phenyl, Y represents a monofunctional radical such as an alkyl group containing 1 to 4 carbon atoms as e.g. methyl, ethyl, propyl, butyl or a halogen atom such as chlorine or bromine, $m$ and $n$ are the same or different integers selected from 0, 1 and 2, $o$ stands for 0 or 1 and $p$ stands for 1 or 2.

Bis-chlorocarbonic acid esters of the following aromatic dihydroxy compounds are mentioned as examples:

4,4′-dihydroxydiphenyl;
4,4′-dihydroxydiphenylmethane;
4,4′-dihyroxydiphenyl propane-(2,2);
4,4′-dihydroxy-3,3′,5,5′-tetrachlorodiphenylpropane-(2,2);
4,4′-dihydroxy-3,3′,5,5′-tetrabromodiphenylpropane-(2,2);
4,4′-dihydroxydiphenylcyclohexane-(1,1);
4,4′-dihydroxydiphenyl ether and
4,4′-dihydroxydiphenyl sulphone.

Copolymers may be prepared by reacting several bis-chlorocarbonic acid esters of aromatic dihydroxy compounds with one or more diaminophenyl compounds.

The technological advance of the invention lies in the use of the more easily accessible tetralkyldiaminophenyl compounds. Whereas the N,N′-dialkyldiaminophenyl compounds used for the known process are not economically accessible by selective dialklation of diaminophenyl compounds, tetraalkylation e.g. of 4,4′-diaminodiphenyl with methyl halides or methanol leads by a smooth reaction to the starting materials to be used according to the invention.

EXAMPLE 1

38.1 g. of bis-(4-N,N-dimethylaminophenyl)-methane, 52.95 g. of bis-chlorocarbonic acid ester of 4,4′-dihydroxydiphenylpropane-(2,2) and 90 g. of diphenyl ether are mixed in a 200 ml. round-bottomed flask with a metal stirrer and a distillation attachment under nitrogen at room temperature and heated to 150° C. in about 15 minutes. The reaction mixture is stirred for one hour at this temperature. Methyl chloride is eliminated. The temperature is raised to 170° C. and stirring is continued for 10 hours. The solvent is then distilled off under reduced pressure. The contents of the flask are dissolved in methylene chloride and the polymer is precipitated from this solution by the addition of ligroin, collected, and dried under vacuum at 100° C. The product has film-forming properties and a relative viscosity of 1.288 determined in methylene chloride at 25° C. with c.=0.5 g./100 ml.

EXAMPLE 2

38.1 g. of bis-(4-N,N-dimethylaminophenyl)-methane, 74.25 g. of bis-chlorocarbonic acid ester of 4,4′-dihydroxy-3,3′,5,5′-tetrachlorodiphenylpropane-(2,2) and 60 g. of o-dichlorobenzene are mixed in a 200 ml. round-bottomed flask with a metal stirrer and a distillation attachment under nitrogen at room temperature and heated to 150° C. in about 15 minutes. The reaction mixture is stirred for one hour at this temperature. Methyl chloride is eliminated. The reaction mixture is then stirred for a further 8 hours at 180° C. The solvent is then distilled off under reduced pressure and the polymer is isolated as in Example 1. The relative viscosity of the polymer is 1.241 measured in methylene chloride at 25° C. with c.=0.5 g./100 ml.

EXAMPLE 3

48 g. of bis-(4-N,N-dimethylaminophenyl)-phenylmethane, 52.1 g. of bis-chlorocarbonic acid ester of 4,4′-dihydroxy-diphenylpropane-(2,2) and 100 g. of diphenyl ether are heated to 150° C. in one hour in the same way as in Example 1 and the temperature is then raised to 240° C. in 2 hours. After a further 30 minutes, the solvent is distilled off under reduced pressure. The polymer is isolated as in Example 1. The relative viscosity is 1.334 measured in methylene chloride at 25° C., c.=0.5 g./100 ml.

EXAMPLE 4

40 g. of bis-α,α′-(4-N,N-dimethylaminophenyl)-p-diisopropylbenzene and 35.3 g. of bis-chlorocarbonic acid ester of 4,4′-dihydroxydiphenylpropane-(2,2) are reacted in the same way as in Example 1 by immersing the reaction flask into an oil bath at 180° C. After half-an-hour's stirring, some of the polymer produced winds round the stirrer. The relative viscosity of this product is 1.387 determined in methylene chloride at 25° C., c.=0.5 g./100 ml.

EXAMPLE 5

20 g. of bis-α,α′-(4-N,N-dimethylaminophenyl)-p-diisopropylbenzene and 18.35 g. of (4 mol percent excess) bis-chlorocarbonic acid ester of 4,4′-dihydroxydiphenylpropane-(2,2) are immersed in an oil bath at 200° C. in the same way as in Example 4 and stirred for ½ hour, then heated to 250° C. and evacuated and nitrogen is then blown through. The contents of the flask, which were previously full of bubbles, collapse to form a clear melt. The relative viscosity of the polymer which contains chlorocarbonic acid ester end groups is 1.17 determined in methylene chloride at 25° C., c.=0.5 g./100 ml.

EXAMPLE 6

31.0 g. of bis-(4-N,N-methyl-n-propylaminophenyl)-methane, 35.3 g. of bis-chlorocarbonic acid ester of 4,4′-dihydroxydiphenylpropane-(2,2) and 90 g. of diphenyl ether are heated to 150° C. as in Example 1 and stirred for one hour. Methyl chloride is eliminated. Stirring is the continued for 8 hours at 180° C. The solvent is then distilled off under reduced pressure and the polymer is isolated as in Example 1. The relative viscosity is 1.275 determined in methylene chloride at 25° C., c.=0.5 g./100 ml.

What is claimed is:

1. A process for producing aromatic poly-N-alkyl urethanes which comprises heating substantially equimolar quantities of an N,N′-dimethyl-N,N′-dialkyldiaminophenyl compound wherein each of said alkyl moieties has from 1 to 4 carbon atoms with a bis-chlorocarbonic acid ester of an aromatic dihydroxy compound at a temperature between about 50 and about 350° C. to produce said urethane and by-product methyl chloride.

2. The process of claim 1 wherein said temperature is between about 120 and about 220° C.

3. The process of claim 1 wherein said heating is carried out in the presence of an inert organic solvent.

4. The process of claim 3 wherein said solvent is selected from the group consisting of xylene, monochlorobenzene, dichlorobenzene, diphenyl ether, diphenyl and chlorinated diphenylene.

5. The process of claim 1 wherein said diaminophenyl compound is of the formula

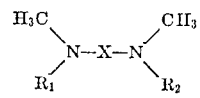

wherein $R_1$ and $R_2$ are alkyl containing 1 to 4 carbon atoms and X is phenylene, diphenylene, diphenylene alkane having 1 to 4 carbon atoms in the alkane moiety, diphenylene cyclohexane, diphenylene ether, diphenylene sulphone, diphenylene sulphoxide, diphenylene sulphide, 1,3-bis-(phenylisopropyl)-benzene or 1,4-bis-(phenylisopropyl)-benzene.

6. The process of claim 1 wherein said bis-chlorocarbonic acid ester is selected from the group consisting of 4,4'-dihydroxydiphenyl;
4,4'-dihydroxydiphenylmethane;
4,4'-dihydroxydiphenyl propane-(2,2);
4,4'-dihydroxy-3,3',5,5'-tetrachlorodiphenyl-propane-(2,2);
4,4'-dihydroxy-3,3',5,5'-tetrabromodiphenyl-propane-(2,2);
4,4'-dihydroxydiphenylcyclohexane-(1,1);
4,4'-dihydroxydiphenyl ether and
4,4'-dihydroxydiphenyl sulphone.

References Cited

UNITED STATES PATENTS 3,385,833  5/1968  Pariser et al. _ _ _ _ _ _ 260—77.5 B

DONALD E. CZAJA, Primary Examiner

M. J. WELSH, Assistant Examiner

U.S. Cl. X.R.

260—47 CB